United States Patent [19]

Honda et al.

[11] Patent Number: 5,475,551
[45] Date of Patent: Dec. 12, 1995

[54] MAGNETIC HEAD

[75] Inventors: Junichi Honda; Seiji Kumagai; Norikatsu Fujisawa, all of Miyagi; Masatoshi Hayakawa, Kanagawa; Masahiro Kikkawa; Miho Suzuki, both of Miyagi, all of Japan

[73] Assignee: Sony Corporation, Tokyo, Japan

[21] Appl. No.: 272,324

[22] Filed: Jul. 8, 1994

[30] Foreign Application Priority Data

Jul. 29, 1993 [JP] Japan ................................ 5-187912
Dec. 28, 1993 [JP] Japan ................................ 5-336252

[51] Int. Cl.$^6$ ................................ G11B 5/235
[52] U.S. Cl. ................................ 360/120
[58] Field of Search ................................ 360/120, 126

[56] References Cited

U.S. PATENT DOCUMENTS

| | | | |
|---|---|---|---|
| 3,736,657 | 6/1973 | Varadi et al. | 29/603 |
| 4,953,049 | 8/1990 | Okuda et al. | 360/126 |
| 5,227,940 | 7/1993 | Isomura et al. | 360/126 |
| 5,278,716 | 1/1994 | Okuda et al. | 360/126 |

Primary Examiner—John H. Wolff
Assistant Examiner—Adriana Giordana
Attorney, Agent, or Firm—Hill, Steadman & Simpson

[57] ABSTRACT

A magnetic head has a pair of magnetic core substrates formed of an oxide magnetic material, at least one of the magnetic core substrates having a gap film formed on an abutment surface thereof, the pair of magnetic core substrates being abutted to each other on the gap film as abutment surfaces, having a magnetic gap formed between them. The gap film is formed of platinum, the platinum group, or an alloy consisting mainly of platinum or the platinum group. The pair of magnetic core substrates are bonded to each other to be integrated into one unit by a non-magnetic glass. The magnetic gap has a track width of not greater than 50 μm. The gap film has a thickness of not greater than 150 nm. The magnetic head includes a pair of magnetic core substrates formed of an oxide magnetic material, at least one of the magnetic core substrates having a gap film formed on an abutment surface thereof, the pair of magnetic core substrates being abutted to each other on the gap film as abutment surfaces, having a magnetic gap formed between them. The gap film is selectively formed of Cr or an alloy consisting mainly of Cr, Ti or an alloy consisting mainly of Ti, or $Ta_2O_5$ or an oxide consisting mainly of $Ta_2O_5$. At least one of the pair of magnetic core substrates has its abutment surface inversely sputtered and then has a gap film formed thereon.

8 Claims, 12 Drawing Sheets 5,475,551

MAGNETIC HEAD

BACKGROUND OF THE INVENTION

This invention relates to a magnetic head preferably adapted for being loaded in a recording and/or reproducing apparatus, such as, a video tape recorder (VTR) or a data storage.

As a magnetic head employed in a 8-mm VTR, a magnetic head, as shown in FIG. 1, has been proposed in which a pair of magnetic core substrates 103, 104 having gap films 101, 102 formed thereon by sputtering are abutted to each other on the gap films 101, 102 as abutment surfaces and are bonded to each other to be integrated into one unit by a fused glass 105, with the abutment surfaces forming a magnetic gap functioning as a recording/reproduction gap.

Normally, the magnetic head of such structure employs a soft magnetic oxide material, such as Mn—Zn ferrite or Ni—Zn ferrite for the magnetic core substrates 103, 104. On the other hand, the magnetic head employs an oxide nonmagnetic material, such as $SiO_2$, for the gap films 101, 102.

Meanwhile, since $SiO_2$ is quartz having a coefficient of thermal expansion nearly equal to zero, a residual stress is generated to the ferrite in the heating and cooling processes required for glass fusion. Also, since $SiO_2$ tends to apply a stress to the magnetic core substrates 103, 104 in sputtering formation, the stress lowers magnetic permeability and soft magnetic property of the ferrite portion on which a film of $SiO_2$ is to be formed. As a result, efficiency of the magnetic cores is lowered.

In addition, as $SiO_2$ is contained in the fused glass 105, erosion of the gap films 101, 102 occurs in the fusion process, causing the glass to contact the ferrite, as shown in FIG. 2. The contact of the glass with the ferrite is also caused by structural defects, that is, a large molecular structure with $SiO_2$ as an oxide and a rough structure of the film.

The contact of the glass with the ferrite causes atomic movement on the boundary face, and subsequent elution of ferrite components into the glass causes slight magnetization of the glass. Thus, a magnetic flux between the cores is more likely to pass through the magnetized glass in the gap and a glass part 106 near a track width restriction groove. As a result, an originally required magnetic flux from the magnetic gap to a medium is weakened.

At the end of the magnetic gap, the structure of $SiO_2$ tends to be rough and chemical potential on the surface rises, causing erosion of $SiO_2$. As a result, the ferrite is eluted and then precipitates again in the cooling process occur. Thus, the ferrite may appear to be continuous in optical observation. In this case, efficiency of the magnetic gap is significantly lowered. Also, the elution of the ferrite causes composition deviation of the ferrite itself and hence deterioration of soft magnetism in the vicinity of the magnetic gap, resulting in deterioration of magnetic head performance.

Such phenomena tend to be promoted by an increase in load for pressing the magnetic core substrates 103, 104 to each other and also by a decrease in thickness of the gap film. For this reason, with a narrower track width and a shorter gap length for recent high-density magnetic recording, a relative stress on the narrower track is increased and the gap film is caused to be thinner, thus raising the possibility of occurrence of the above phenomena. Consequently, head output is reduced and the narrowing of the track is disturbed.

Thus, a low-temperature fusion method has been proposed by which erosion of $SiO_2$ due to glass and the contact of the glass with ferrite are rarely caused. The low-temperature fusion includes an etching treatment using a sputtering phenomenon, called inverse sputtering, on a gap film formation surface prior to the formation of the gap films on the magnetic core substrates by sputtering. The inverse sputtering herein means an etching treatment to the surfaces of the magnetic core substrates by sputtering Ar and N ions to the magnetic core substrates instead of a target of normal sputtering.

In further detail, in the low-temperature fusion method, the gap formation surfaces of the magnetic core substrates processed with a predetermined treatment are abraded so that the arithmetical mean deviation of profile Ra prescribed by JIS B0601 is 20 to 100 Å. After the gap formation surface of at least one of the magnetic core substrates is inversely sputtered to be a smooth surface, the gap film of $SiO_2$ is formed on the gap formation surface by sputtering.

Then, the pair of magnetic core substrates are abutted to each other on the gap formation surfaces as abutment surfaces with a gap spacer between them, and are bonded to each other to be integrated into one unit by a fused glass of appropriate composition. In the low-temperature fusion, viscosity of the fused glass in fusion is prescribed. As the result of studies by the present inventors, it has been found that the viscosity of the fused glass in fusion may be 160000 (Pa·s) for sufficiently filling the fused glass into a space between the magnetic core substrates for preventing the erosion of $SiO_2$ due to the fused glass. It has also been found that the fusion temperature may be 520° C. for obtaining the above-mentioned viscosity in fusion in case where a certain fused glass exhibits viscosity in relation to temperatures as shown in FIG. 3. In FIG. 3, the viscosity is expressed by log η. Thus, the low-temperature fusion is carried out at 520° C. using the glass having the temperature-viscosity characteristics shown in FIG. 3.

As a result, a magnetic head having a magnetic gap serving as a recording/reproduction gap between abutment surfaces of magnetic core substrates is formed.

In this magnetic head, the erosion of $SiO_2$ at the end of the magnetic gap, the contact of the glass with the ferrite, and the weakening of the leakage magnetic flux from the magnetic gap are less likely to occur than in the previously-described magnetic head, thus improving characteristics.

However, the production of the magnetic head using the low-temperature fusion causes the following inconvenience. That is, a deviation in temperature of the fused glass in fusion excessively affects quality of the magnetic head as the end product, and the allowable range of the fusion temperatures is too narrow, thus resulting in unsatisfactory productivity.

At a fusion temperature lower than the optimum temperature, the fused glass is not sufficiently filled in the space between the magnetic core substrates. On the contrary, at a higher fusion temperature, gap films 111, 112 of $SiO_2$ formed on magnetic core substrates 113, 114 are eroded by a fused glass 115, as shown in FIG. 4.

Consequently, it is necessary to limit the fusion temperature difference to the minimum level, and to employ a fusion furnace of high temperature precision while implementing sufficient temperature control. Thus, mass production is difficult and productivity is unsatisfactory. In addition, if mass production is carried out using the low-temperature fusion, irregularity tends to be generated in degree of erosion of $SiO_2$ among magnetic heads. Thus, mass production is difficult and productivity remains unsatisfactory.

Even though the fusion is carried out at the optimum fusion temperature in producing the magnetic head with the technique of low-temperature fusion method, the fused glass reacts with SiO$_2$, forming a reaction layer 118 on the boundary face between the fused glass 115 and the gap films 111, 112, as shown in FIG. 5. Thus, it is impossible to perfectly prevent erosion of SiO$_2$.

This has also been apparent from the following fact. A film of SiO$_2$ was formed with a thickness of 850 Å on a substrate formed of magnetic ferrite, and a fused glass having a thickness of 2000 Å estimated to be required for producing the magnetic head with the low-temperature fusion method was formed on the film of SiO$_2$. The resulting product was heat-treated at 530° C. for one hour. The analysis of the boundary face between SiO$_2$ and the magnetic ferrite was conducted with the Auger Electron Spectroscopy. The result is shown in FIG. 6. From this result, it can be found that SiO$_2$ reacts with the fused glass, forming the reaction layer on the boundary face, and that erosion of SiO$_2$ is not perfectly prevented. In FIG. 6, abscissas indicate the depth in the direction of film thickness with 0 indicating the surface of the fused glass, while ordinates indicate relative concentration.

Even though the magnetic head is produced with the low-temperature fusion method, as long as the SiO$_2$ film is used as the gap film, with the coefficient of thermal expansion of SiO$_2$ nearly equal to zero as described above, a stress is generated to the portion of the magnetic core substrate in which the SiO$_2$ film is formed. Thus, there is a possibility that SiO$_2$ is eroded.

SUMMARY OF THE INVENTION

In view of the present status of the art, it is an object of the present invention to provide a magnetic head by which it is possible to prevent contact of glass with ferrite using a dense gap film, reduce stress to the ferrite of the gap film and improve adhesion of the gap film to the fused glass, and which is thus suitably adapted for mass production and high-density recording.

According to the present invention, there is provided a magnetic head including a pair of magnetic core substrates formed of an oxide magnetic material. At least one of the magnetic core substrates has a gap film formed on an abutment surface thereof. The pair of magnetic core substrates are abutted to each other on the gap film as abutment surfaces thereof, having a magnetic gap between the abutment surfaces. The gap film is formed of a material selected from platinum, the platinum group, and an alloy consisting mainly of platinum or the platinum group.

In the magnetic head according to the present invention, the pair of magnetic core substrates are bonded to each other to be integrated into one unit by a non-magnetic glass. The magnetic gap has a track width of not greater than 50 μm. The gap film has a thickness of not greater than 150 nm.

Meanwhile, the present inventors have found it possible to prevent erosion of the gap film and improve adhesion between the gap film and a fused glass by using a particular material instead of platinum as the gap film.

That is, according to the present invention, there is provided a magnetic head including a pair of magnetic core substrates formed of an oxide magnetic material, at least one of the magnetic core substrates having a gap film formed on an abutment surface thereof, the pair of magnetic core substrates being abutted to each other on the gap film as abutment surfaces thereof, having a magnetic gap between the abutment surfaces, the gap film being formed of a material selected from Cr and an alloy consisting mainly of Cr, a material selected from Ti and an alloy consisting mainly of Ti, or a material selected from Ta$_2$O$_5$ and an oxide consisting mainly of Ta$_2$O$_5$.

Also, the present inventors have found that improving smoothness of a gap film formation surface prior to the formation of the gap film makes it possible to improve characteristics of the magnetic head.

That is, in the magnetic head of the present invention, at least one of the pair of magnetic core substrates has its abutment surface inversely sputtered and then has a gap film formed on the abutment surface.

DETAILED DESCRIPTION OF THE PREFERRED EMBODIMENTS

Preferred embodiments of the present invention will now be described in detail with reference to the accompanying drawings.

Embodiment 1

In the present embodiments, a magnetic head having a gap film formed of platinum, the platinum group, or an alloy consisting mainly of platinum or the platinum group is described. The magnetic head is adapted for being loaded in an 8-mm VTR.

Figure 7:
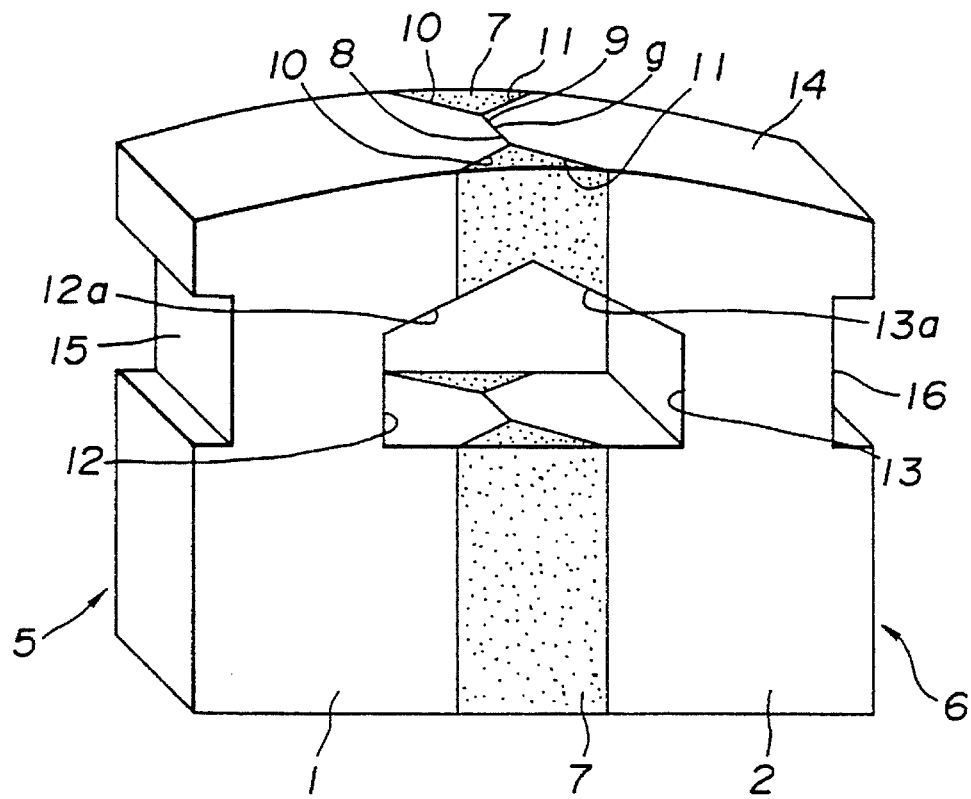
FIG. 7 is a perspective view showing an example of a magnetic head according to the present invention.
Figure 8:
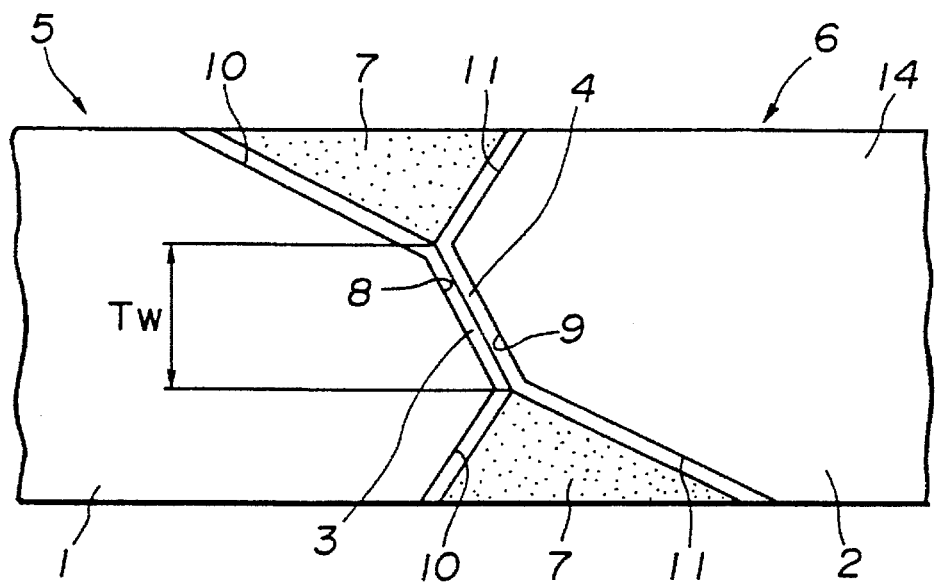
FIG. 8 is an enlarged plan view showing essential portions of a magnetic recording medium rubbing surface of the magnetic head shown in FIG. 7.

The magnetic head in the present embodiment has a pair of magnetic core halves 5, 6 including magnetic core substrates 1, 2 of an oxide magnetic material and gap films 3, 4 deposited on abutment surfaces of the magnetic core substrates 1, 2, as shown in FIGS. 7 and 8. The magnetic core halves 5, 6 are abutted to each other on the gap films 3, 4 and are bonded to each other to be integrated into one unit by a fused glass 7. A magnetic gap g having an azimuth and serving as a recording/reproduction gap is formed between the abutment surfaces.

The pair of magnetic core substrates 1, 2 are formed of a soft magnetic oxide material, such as Mn—Zn ferrite or Ni—Zn ferrite. Magnetic gap formation surfaces 8, 9 in parallel to the magnetic gap g having the azimuth, and inclined surfaces 10, 11 not in parallel to the magnetic gap formation surfaces 8, 9 and defined by a track with restriction groove, are formed on the abutment surfaces of the magnetic core substrates 1, 2.

The magnetic gap formation surfaces 8, 9 are formed by notching due to the track width restriction groove, so as to have a track width Tw of the magnetic gap g.

On the abutment surfaces of the magnetic core substrates 1, 2, winding grooves 12, 13 of U-shape cross section for coil winding are passing through in the direction of core thickness. Inclined surfaces 12a, 13a of the winding grooves 12, 13, provided on the side of a magnetic recording medium rubbing surface 14, serve to restrict the depth of the magnetic gap g.

On the other hand, on the lateral sides opposite to the abutment surfaces of the magnetic core substrates 1, 2, winding guide grooves 15, 16 are provided for assuring the wound state of the coil wound through the winding grooves 12, 13. The winding guide grooves 15, 16 are formed in rectangular cross section and in positions opposite to the winding grooves 12, 13.

The gap films 3, 4 are formed continuously from the front side to the back side on the magnetic gap formation surfaces 8, 9 on the abutment surfaces of the magnetic core substrates 1, 2 and on the inclined surfaces 10, 11 provided on both sides of the gap formation surfaces 8, 9. The gap films 3, 4 are also formed in the winding grooves 12, 13. However, it is also permissible not to form the gap films 3, 4 in portions away from the gap formation surfaces 8, 9.

The pair of magnetic core halves 5, 6 of the above structure are abutted to each other with track positions thereof meeting each other and with a gap spacer provided between the gap films 3, 4 formed on the magnetic gap formation surfaces 8, 9. The magnetic core halves 5, 6 are bonded to each other to be integrated into one unit by the non-magnetic fused glass 7 filled in gap portions at both ends of the magnetic gap g. The magnetic gap g serving as the recording/reproduction gap is thus formed between the gap films 3, 4.

The fused glass 7 is filled into the space between the gap films 3, 4 facing each other, and the total thickness of the fused glass 7 and the gap films 3, 4 serves as the gap length, not shown, of the magnetic gap g. In the present invention, the track width Tw of the magnetic gap g is not greater than 50 µm and the thickness of the gap films 3, 4 is not greater than 150 nm, in order to carry out high density magnetic recording.

Particularly in the present embodiment, platinum, the platinum group, or an alloy consisting mainly of platinum or the platinum group is used for the gap films 3, 4. The platinum group is exemplified by ruthenium, rhodium, palladium, osmium and iridium, other than platinum. These platinum and platinum group have characteristics of minute sputtering particles and hence high surface covering property. Since a normal conductive metal has large particles and thus is not suitable for obtaining an image highly magnified in observation of an insulating material with a scanning electron microscope, platinum or a platinum-palladium alloy is employed instead.

Also, the platinum group has a dense crystalline structure, such as face centered cubic lattice or hexagonal close-packed structure. Therefore, the covering property is improved in comparison with the oxide material, such as $SiO_2$, and the contact of the glass with the ferrite is less likely to occur. As seen from the fact that platinum is used for a pot for producing single crystal of ferrite, platinum has a high melting point and is insoluble into ferrite or glass, thus maintaining the dense film structure without causing erosion or diffusion even in high-temperature fusion due to glass fusion.

Figure 9:
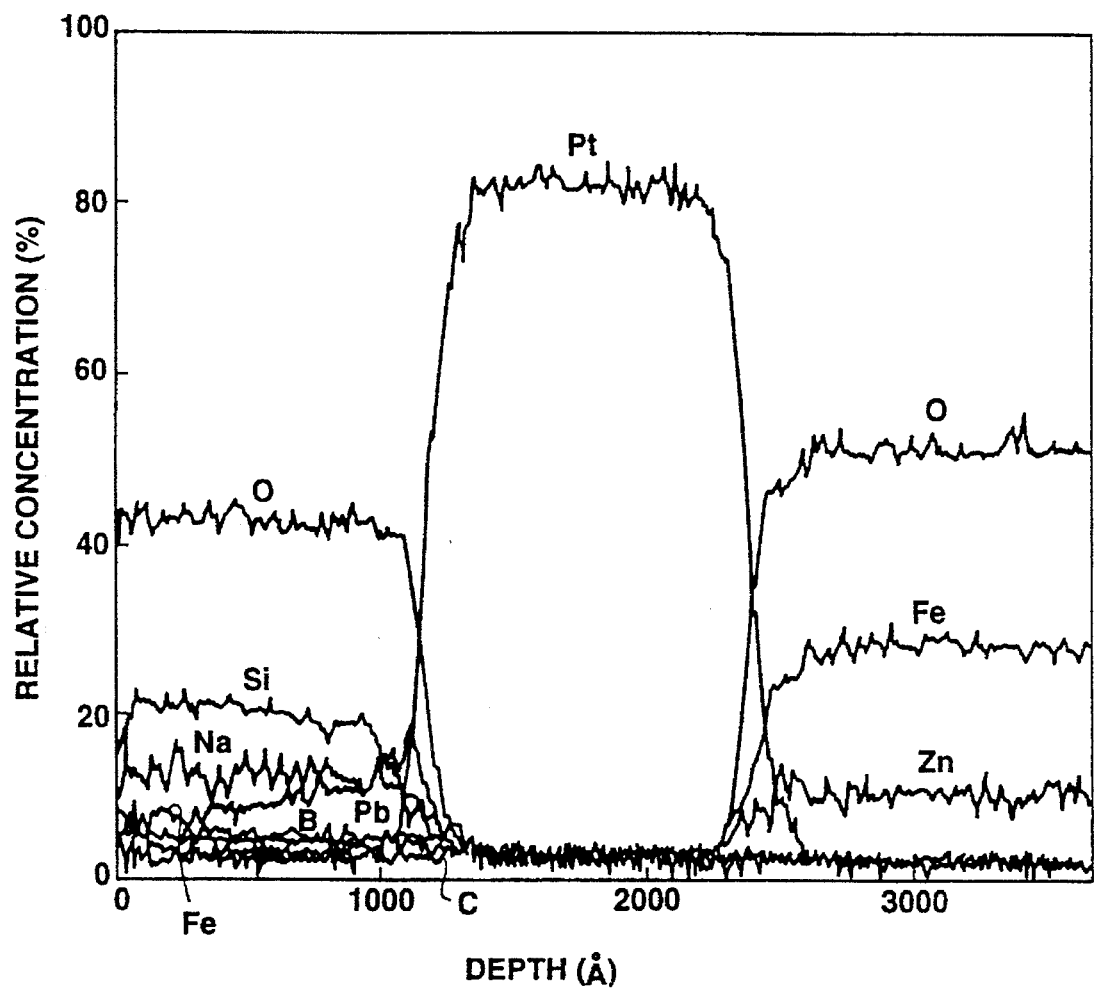
FIG. 9 is a graph showing results of an analysis of a boundary face between platinum and magnetic ferrite.

These properties of platinum has been made apparent by the following fact. A film of platinum was formed with a thickness of 850 Å on a substrate of magnetic ferrite, and a fused glass with a thickness of 2000 Å estimated to be required for producing the magnetic head was formed on the platinum film by sputtering. The resulting product was heat-treated at 530° C. for one hour. The analysis of the boundary face between platinum and magnetic ferrite at this point was conducted with the Auger Electron Spectroscopy. The results of the analysis are shown in FIG. 9. From these results, it has been found that platinum has not reacted with the fused glass, and that erosion of platinum is prevented. In FIG. 9, abscissas indicate the depth of film thickness with 0 indicating the surface of the fused glass, while ordinates indicate relative concentration.

Also, platinum exhibits the coefficient of thermal expansion of $91 \times 10^{-7}$ (/°C.), and the Pt-Pd alloy exhibits the coefficient of thermal expansion of approximately $100 \times 10^{-7}$ (°C.), in conformity with the coefficient of thermal expansion of the ferrite. Therefore, platinum and the Pt-Pd alloy do not generate any residual stress to the ferrite due to sputtering and heat-treatment.

Because of such characteristics of platinum and the Pt-Pd alloy, unlike the case where the $SiO_2$ is used for the gap film, the magnetic gap is maintained, and the glass, not shown, in the gap and the gap films 3, 4 are maintained in a perfectly non-magnetic state even though the magnetic head is formed with a narrower track width and a shorter gap length. Consequently, a leakage magnetic flux to the magnetic recording medium sufficiently occurs in the magnetic gap, thus achieving high recording/reproduction performance.

Figure 10:
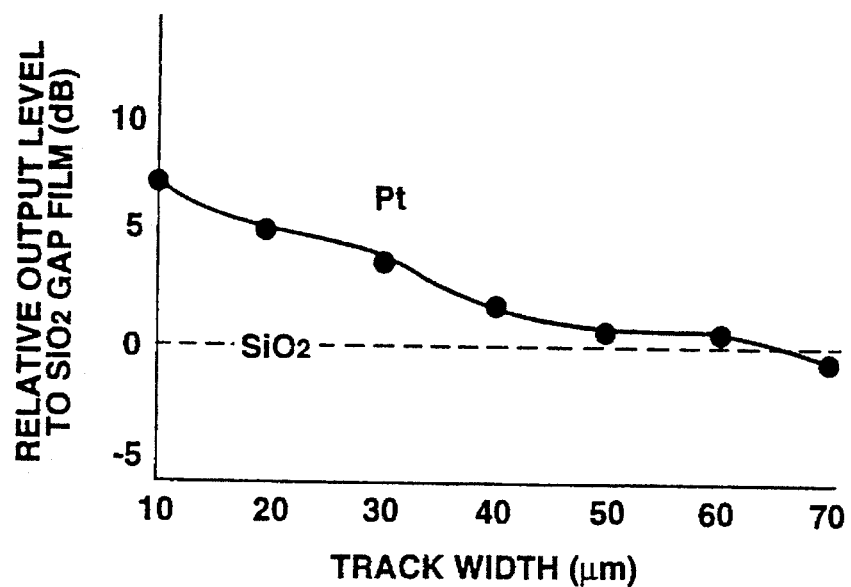
FIG. 10 is a graph showing track width dependence of the relative output level to an SiO$_2$ gap film with the use of platinum for a gap film.
Figure 11:
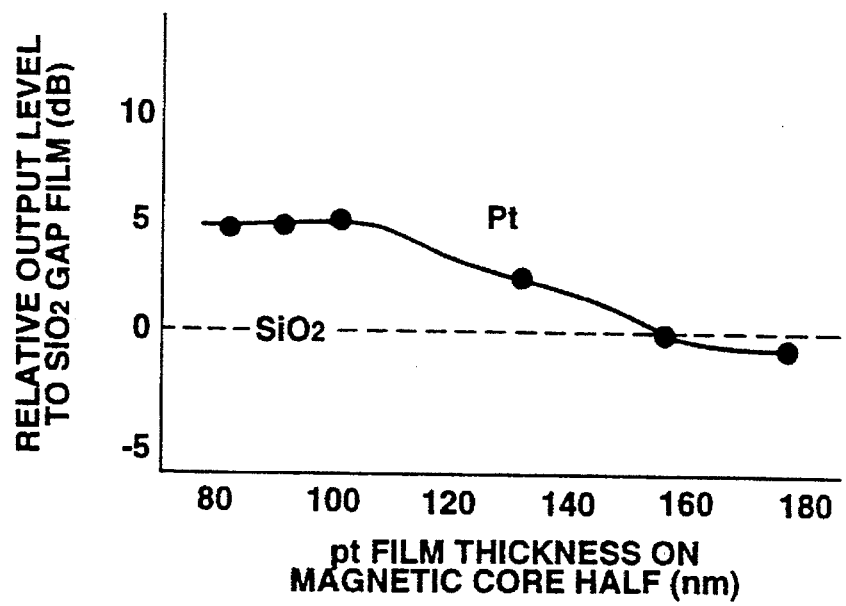
FIG. 11 is a graph showing gap film thickness dependence of the relative output level to the SiO$_2$ gap film with the use of platinum for the gap film.

Also, if platinum is used, it is seen, from FIG. 10 showing the track width dependence of the relative output level with an output being 0 dB in case of the gap film of $SiO_2$, that the relative output is considerably higher than in $SiO_2$ even with a narrow track width Tw of not greater than 50 µm. Similarly, as is apparent from FIG. 11 showing platinum film thickness dependence of the relative output level with the output being 0 dB in the case of the gap film of $SiO_2$, the relative output is considerably higher than in $SiO_2$ even with a shorter gap length of not greater than 150 nm.

A method of producing the above-described magnetic head will now be described.

Figure 12:
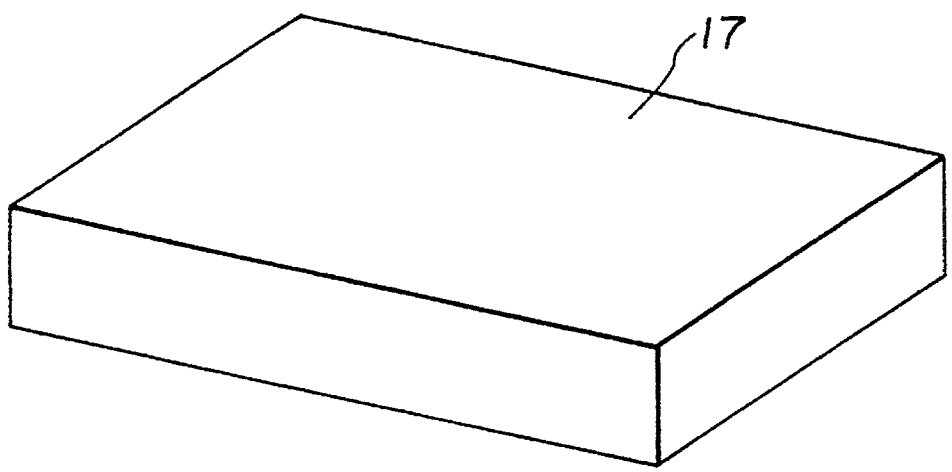
FIG. 12 is a perspective view showing a production process of a core half block in a sequence of production processes of the magnetic head of the present invention.

First, a substrate which is formed of a soft magnetic oxide material, such as Mn—Zn ferrite or Ni—Zn ferrite, and is large enough for forming 14 core half blocks, is cut into core half blocks 17, each being 45×45×1 (mm) in size, as shown in FIG. 12.

Figure 13:
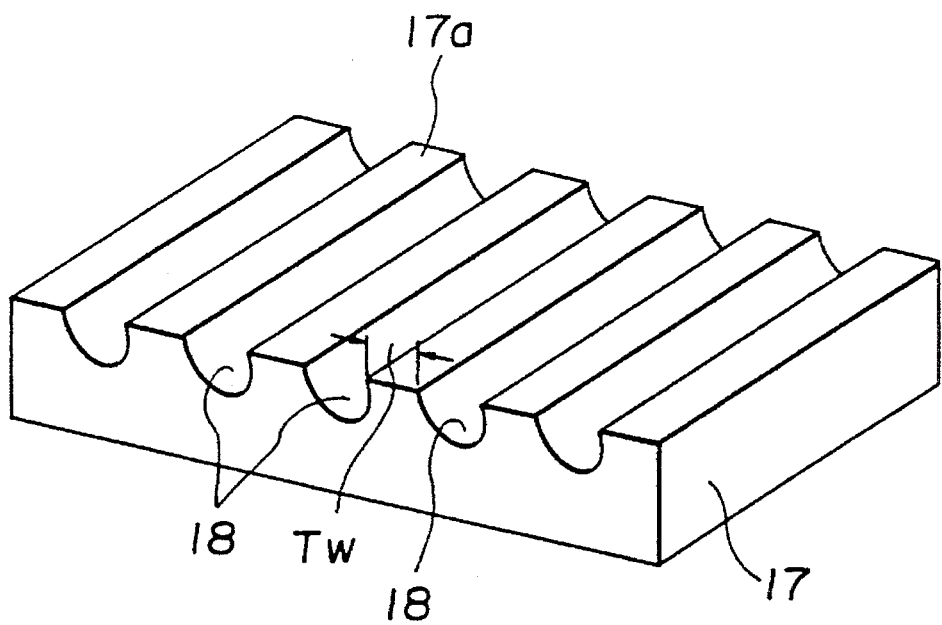
FIG. 13 is a perspective view showing a formation process of a track width restriction groove in the sequence of production processes of the magnetic head of the present invention.

Then, plural track width restriction grooves 18 having U-shaped cross section are formed on a major surface 17a of the core half block 17 so that predetermined track widths Tw remain in the longitudinal direction of the block, as shown in FIG. 13.

In the present embodiment, the U-shaped track width restriction groove 18 is formed, so as to have an angle of the contacting part to the major surface 17a equal to 60°, a groove opening width of 190 µm, a depth of 95 µm and a residual track width of 16 µm.

Although the track width restriction groove 18 is formed in the U-shaped cross section in the above example, it may also be formed in a V-shaped cross section.

Figure 14:
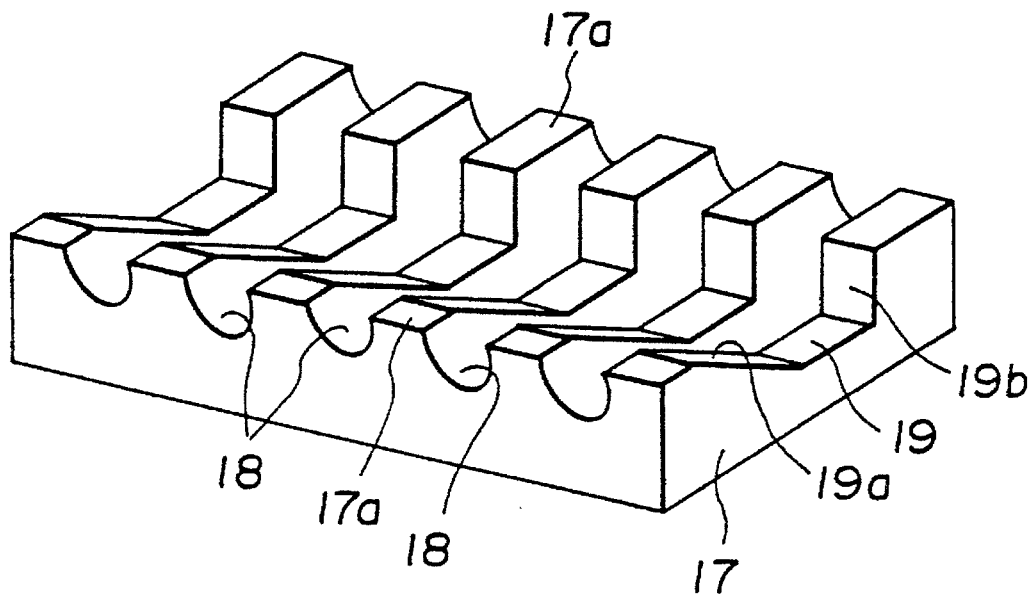
FIG. 14 is a perspective view showing a formation process of a winding groove in the sequence of production processes of the magnetic head of the present invention.

Then, a winding groove 19 for winding a coil in the direction orthogonal to the track width restriction groove 18 is formed on the major surface 17a of the core half block 17, as shown in FIG. 14.

In the present embodiment, the winding groove 19 of cross section having an opening width of 650 µm, a depth of 200 µm, an angle of 40° formed by the major surface 17a with an inclined surface 19a in the end portion near the rubbing surface, and an angle 90° formed by the major surface 17a with an inclined surface 19b in the opposite end portion.

After that, the major surface 17a of the core half block 17 is abraded to have surface roughness of approximately 50 nm.

Figure 15:
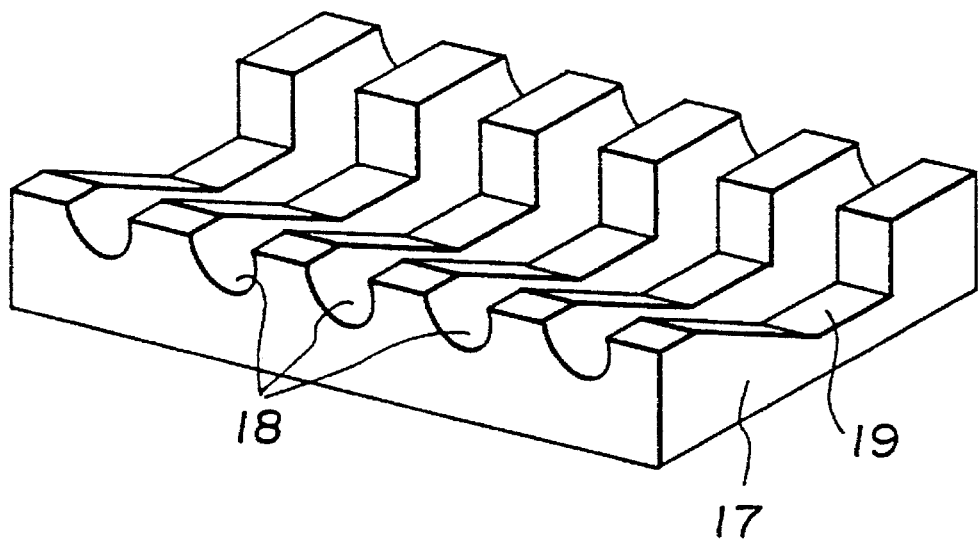
FIG. 15 is a perspective view showing a formation process of a gap film in the sequence of production processes of the magnetic head of the present invention.

Then, a gap film of platinum, not shown, is formed on the major surface 17a of the core half block 17 including the track width 18 and the winding groove 19, as shown in FIG. 15.

In forming the gap film, a target of pure platinum having a diameter of 6 inch is sputtered with a making power of 300 W by the RF magnetron sputtering, so as to be 90 nm in film thickness.

As platinum has the coefficient of thermal expansion substantially in conformity of that of ferrite, it does not generate any residual stress to the ferrite due to sputtering.

Figure 16:
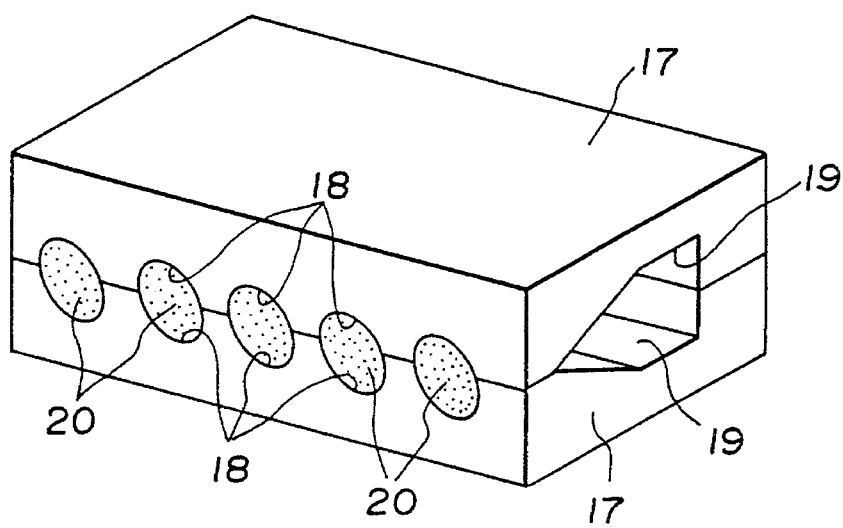
FIG. 16 is a perspective view showing a process of glass fusion in the sequence of production processes of the magnetic head of the present invention.

Next, the similarly produced core half blocks 17, 17 are superposed with the track position thereof meeting each other, as shown in FIG. 16.

A glass stick, not shown, is inserted into the winding grooves 19, 19, and is melted through heating so that a fused glass 20 is filled into a space between the track width restriction grooves 18, 18.

Since the gap film of platinum is of the dense structure and insoluble into ferrite or glass, even though it is heated at high temperatures in the above fusion process, the gap film is not eroded by the glass and dispersion of ferrite and glass does not occur.

Figure 17:
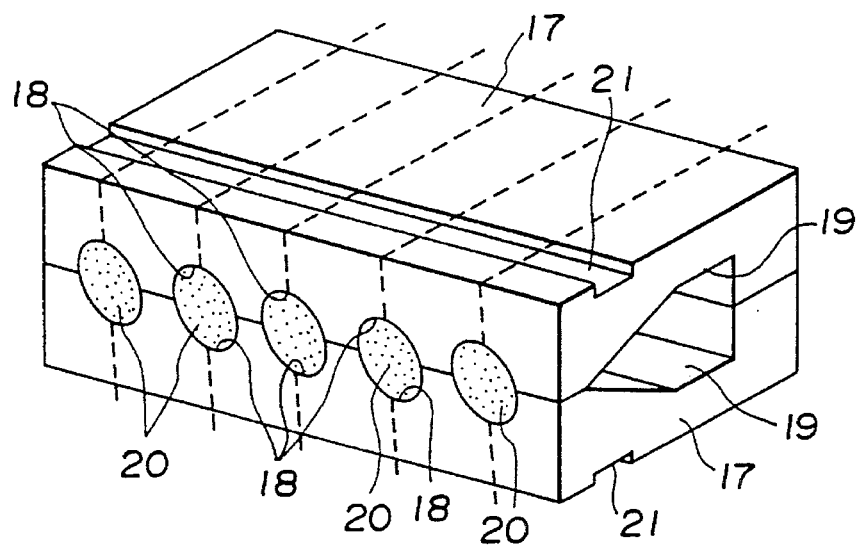
FIG. 17 is a perspective view showing a formation process of a winding guide groove in the sequence of production processes of the magnetic head of the present invention.

As shown in FIG. 17, winding guide grooves 21, 21 are formed in positions opposite to the winding grooves 19 of a core block integrated by the fused glass 20.

Then, after the portion to be the rubbing surface to rub the magnetic recording medium is cylindrically abraded to be a curved surface, the core block is sliced into chips in the positions indicated by dotted lines in FIG. 17 so that the magnetic gap g has an azimuth of 20°.

A resulting head chip is finished to have an outer dimensional width of 1500 µm, a height of 1900 µm and a thickness of 220 µm.

Winding was implemented to the magnetic head thus produced so that the inductance was approximately 1.8 µH, and the output thereof was measured. In a comparative example, the output of the magnetic head of the same structure except for the gap film of $SiO_2$ was measured.

As a result, the magnetic head having the gap film of platinum exhibited 180 µVp-p at 4.5 MHz, while the magnetic head having the gap film of $SiO_2$ exhibited 105 µVp-p. Thus, it has been found that the gap film of platinum significantly improves the output by approximately 5 dB compared with the gap film of $SiO_2$.

Embodiment 2

In the present embodiment, a magnetic head of the same structure as the magnetic head of Embodiment 1, except for a gap film formed of Cr or an alloy consisting mainly of Cr, will be described.

The magnetic head of the present embodiment, similar to the magnetic head shown in FIGS. 7 and 8, has the pair of magnetic core halves 5, 6 including the magnetic core substrates 1, 2 of oxide magnetic material and the gap films 3, 4 deposited on the abutment surfaces of the magnetic core substrates 1, 2. The magnetic core halves 5, 6 are abutted to each other on the abutment surfaces 3, 4, and are bonded to each other to be integrated into one unit by the fused glass 7. The magnetic head g having the azimuth and serving as the recording/reproduction gap is formed between the abutment surfaces. Other parts corresponding to those of Embodiment 1 are not described herein.

In the magnetic head of the present embodiment, the gap films 3, 4 are formed of Cr or an alloy consisting mainly of Cr. Cr and the alloy consisting mainly of Cr are metals, and therefore do not cause particle dispersion due to erosion by glass as in the case of the oxide, such as $SiO_2$. Thus, erosion of the gap film and the contact with ferrite can be avoided, and dispersion between the glass and ferrite is consequently eliminated. That is, in the magnetic head of the present embodiment, unlike the magnetic head having the gap film of $SiO_2$, the magnetic gap is maintained even though the magnetic head is formed with a narrower track width and a shorter gap length. The glass and the gap films 3, 4 in the gap are maintained in the perfectly non-magnetic state. Consequently, the leakage magnetic flux toward the magnetic recording medium sufficiently occurs in the magnetic gap, achieving high recording/reproduction performance.

Figure 18:
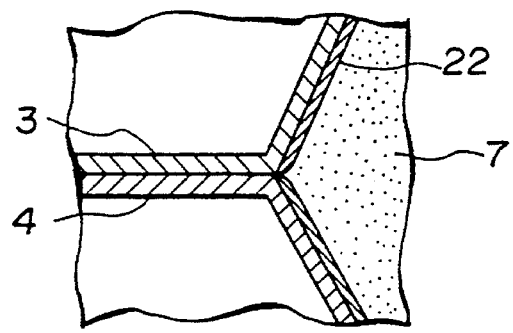
FIG. 18 is an enlarged plan view showing essential portions near the boundary face between the gap film and the fused glass of the magnetic head of the present invention.

Also, in the magnetic head of the present invention, an oxidation layer 22 of Cr or an alloy consisting mainly of Cr is formed, on the boundary face between the gap films 3, 4 and the fused glass 7, as shown in FIG. 18. Thus, adhesion of the gap films 3, 4 to the fused glass 7 is improved, increasing chip strength of the magnetic head.

Figure 19:
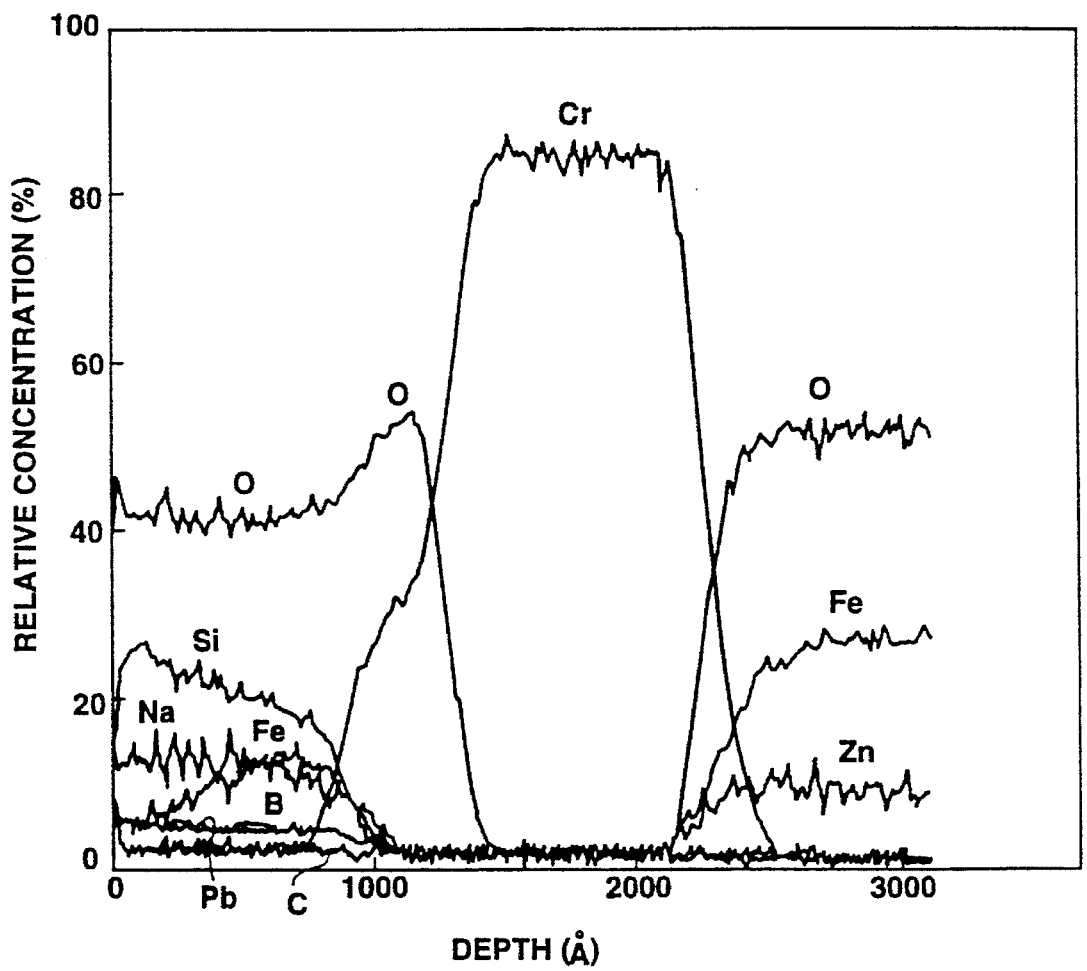
FIG. 19 is a graph showing results of an analysis of the boundary face between Cr and the magnetic ferrite.

The above effect is made apparent by the following fact. A film of Cr was formed with a thickness of 850 Å on a substrate of ferrite, and a fused glass with a thickness of 2000 Å estimated to be required for producing the magnetic head was formed on the Cr film by sputtering. The resulting product was heat-treated at 530° C. for one hour. The analysis of the boundary face between Cr and the magnetic ferrite at this point was conducted with the Auger Electron Spectroscopy. The results of the analysis are shown in FIG. 19. The results indicate that the oxidation layer is formed on the Cr film surface, and that the magnetic head of the present embodiment having the gap film of Cr or the like exhibits improvement in adhesion of the gap film to the fused glass and an increase in chip strength. In FIG. 19, abscissas indicate the depth in the direction of film thickness with 0 indicating the surface of the fused glass, while ordinates indicate relative concentration.

A method of producing the magnetic head of the present embodiment will now be described. As the method is substantially equivalent to the production method of Embodiment 1, the corresponding parts will not be described.

First, the core half block 17 formed of a soft magnetic oxide material, such as Mn—Zn ferrite or Ni—Zn ferrite, as shown in FIG. 12, is prepared with a length of 30 and a thickness of 2.9 (mm).

Similar to Embodiment 1, as shown in FIG. 13, the plural track width restriction grooves 18 are formed on the major surface 17a of the core half block 17. In the present invention, however, the track width restriction groove 18 is formed with the one lateral side thereof forming a predetermined angle β ranging from 8° to 45° with the vertical surface, for example, the other lateral side of the track width restriction groove 18, for preventing crosstalk. The track width restriction groove 18 has a depth of approximately 60 μm and a track width of 15 μm.

Then, the major surface 17a of the core half block 17 is abraded to have the arithmetical mean deviation of profile Ra of 20 to 100 Å. After that, similar to Embodiment 1 as shown in FIG. 14, the winding groove 18 is formed in the direction orthogonal to the track width restriction groove 18.

After the major surface 17a of the core half block 17 is inversely sputtered to improve smoothness thereof, a gap film of Cr, not shown, is formed by sputtering on the major surface 17a of the core half block 17 including the track width restriction groove 18 and the winding groove 19, as shown in FIG. 15. In the present embodiment, the gap film of Cr has a thickness of 850 Å.

Then, the similarly produced core half blocks 17, 17 are superposed with the track positions thereof meeting each other, as shown in FIG. 16.

A glass stick, not shown, is inserted into the winding grooves 19, 19, and is melted by heating so that the fused glass is filled into the space between the track width restriction grooves 18, 18 facing each other.

Figure 1:
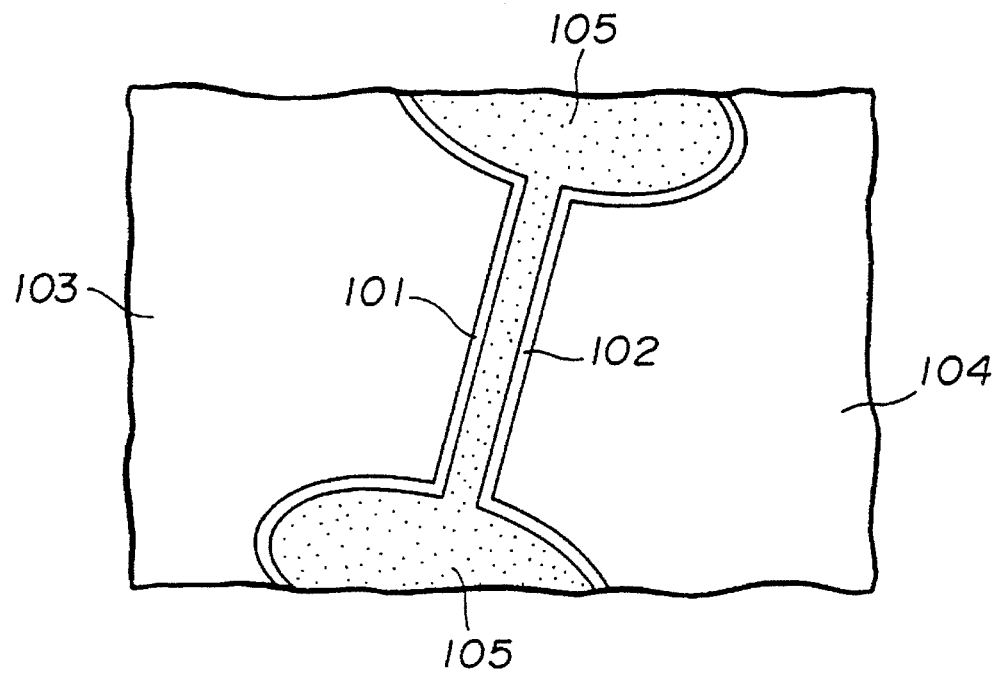
FIG. 1 is an enlarged plan view showing essential portions of a magnetic recording medium rubbing surface of a conventional magnetic head having a gap film of SiO$_2$.
Figure 2:
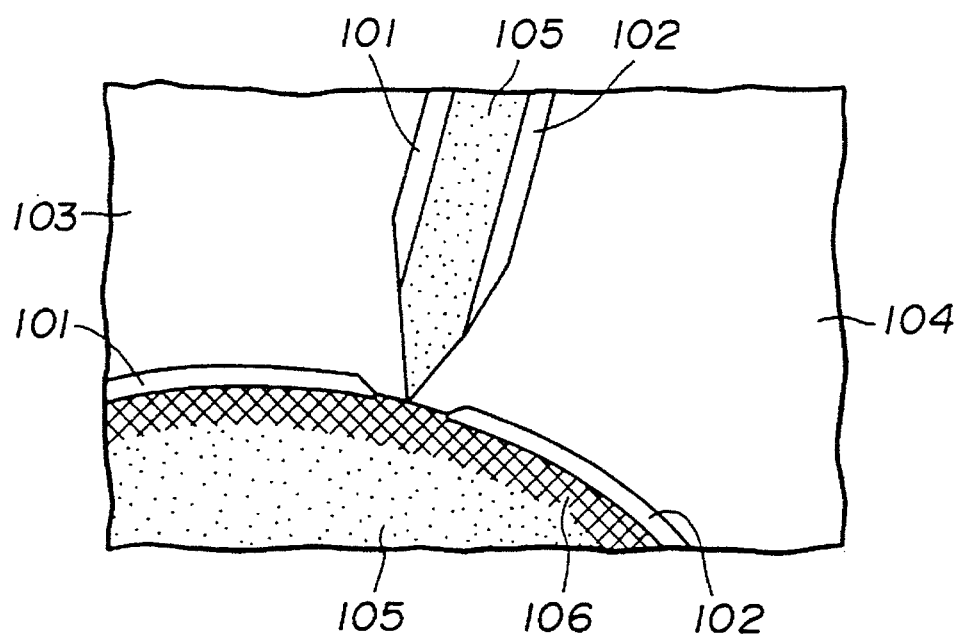
FIG. 2 is an enlarged plan view showing essential portions of the magnetic recording medium rubbing surface of the conventional magnetic head having the gap film of SiO$_2$, with the gap film being eroded by glass.
Figure 3:
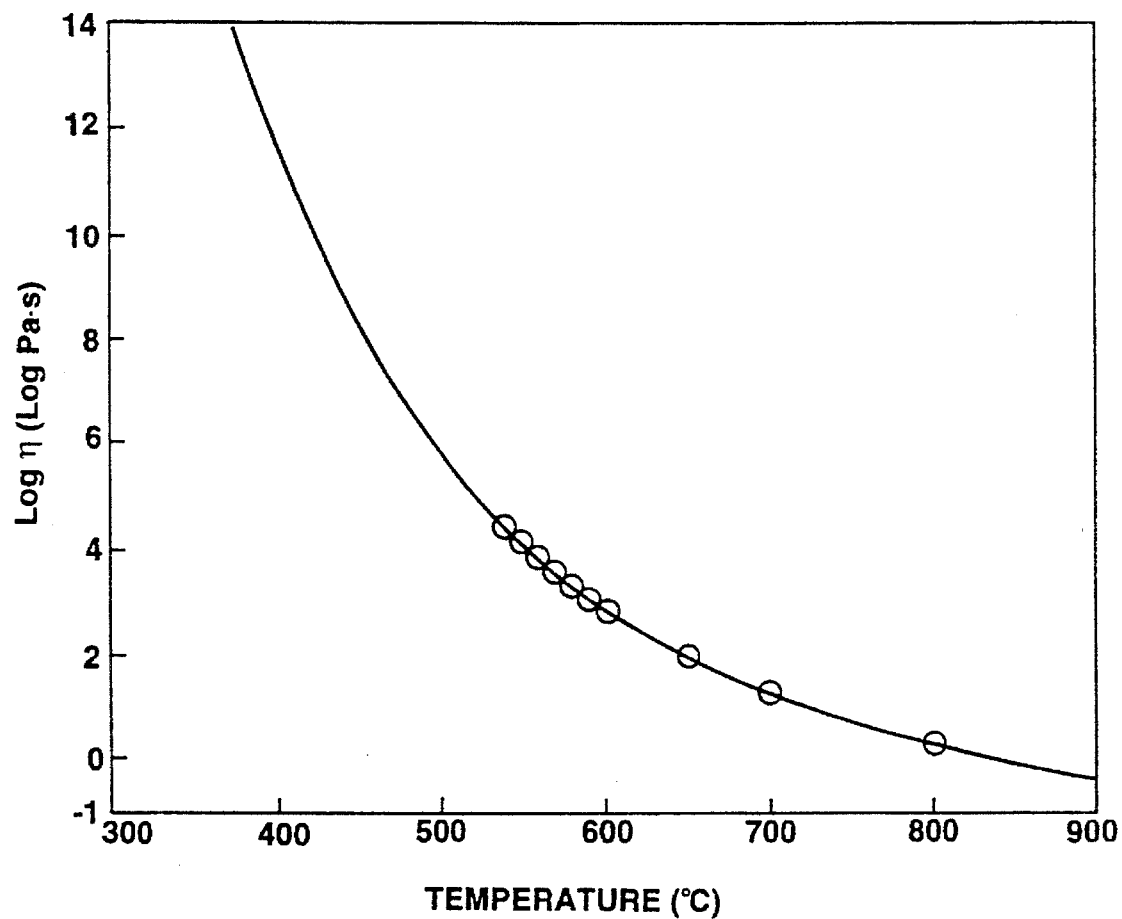
FIG. 3 is a diagram showing relations between temperatures and viscosity of a fused glass.
Figure 4:
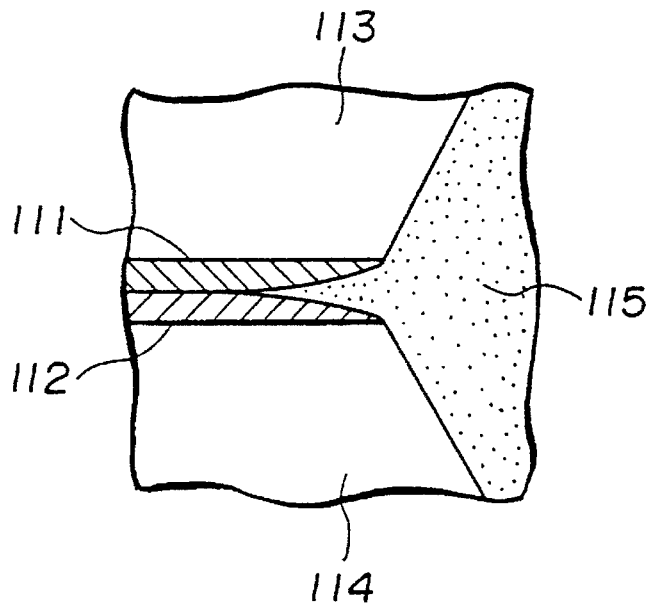
FIG. 4 is an enlarged plan view showing essential portions of the magnetic recording medium rubbing surface of the conventional magnetic head having the gap film of SiO$_2$, in which the gap film and the fused glass of low-temperature fusion are shown.
Figure 5:
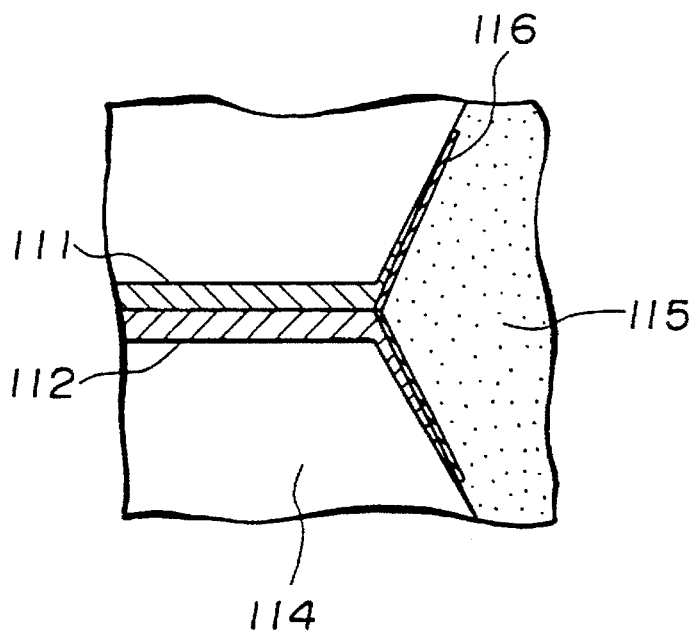
FIG. 5 is an enlarged plan view showing essential portions of the magnetic recording medium rubbing surface of the conventional magnetic head having the gap film of SiO$_2$, in which the gap film and the fused glass of the optimum-temperature fusion are shown.
Figure 6:
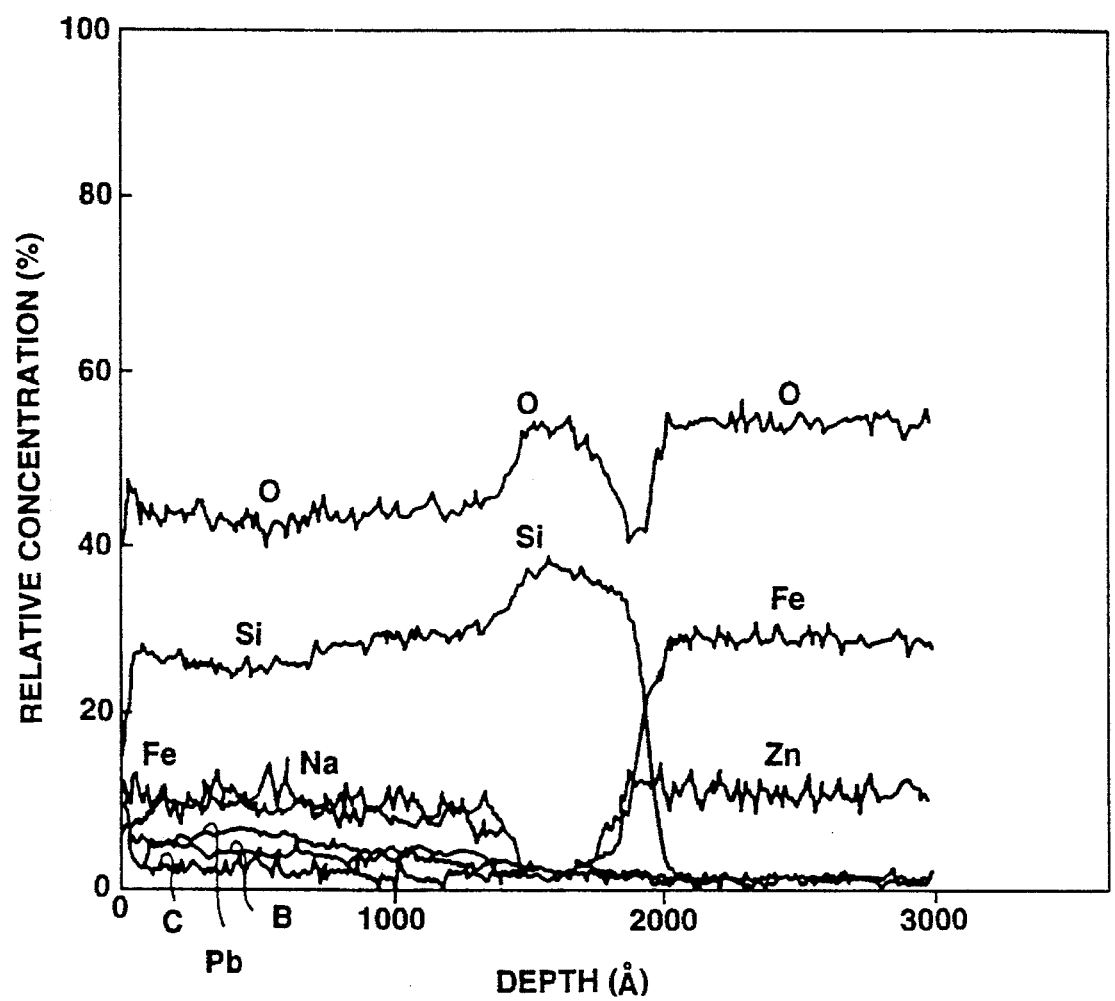
FIG. 6 is a graph showing results of the analysis of the boundary face between SiO$_2$ and magnetic ferrite.

In the present invention, the fusion temperature is set in a range of 530° to 580° C., for prescribing the viscosity of the fused glass 20 in fusion. As seen from the results shown in FIG. 3, the viscosity of 64000 (Pa·S) for sufficiently filling the fused glass 20 into the space between the core half blocks 17 is obtained at 530° C., and the viscosity of 10000 (Pa·S) for the glass to start eroding the gap film of Cr in the fusion process is obtained at 560° C.

Since the gap film of Cr is metallic and does not cause particle dispersion due to erosion by glass as in the case of an oxide, such as $SiO_2$, even though it is heated at high temperatures in the above fusion process, the gap film is not eroded by the glass and dispersion between ferrite and glass does not occur.

Next, a head chip produced by various treatments and subsequent slicing into chips as in Embodiment 1 is finished so as to have an outer dimensional width of 1500 μm and a height of 1900 μm. In the present embodiment, the azimuth angle is set at 20°.

In the present embodiment, since the oxidation layer of Cr is formed on the boundary face between the gap film of Cr and the fused glass, adhesion between the gap film and the fused glass is improved and chip strength is increased. Thus, the magnetic head is not damaged in the above-mentioned processes.

In comparison with the magnetic head thus produced, the output of the magnetic head of the same structure with the gap film of $SiO_2$ was measured.

As a result, the magnetic head having the gap film of Cr exhibited 170 μVp-p at 3.13 m/s, 4.7 MHz, while the magnetic head having the gap film of $SiO_2$ exhibited 112 μVp-p. Thus, it has been found that the gap film of Cr significantly improves the output by 3.85 dB compared with the gap film of $SiO_2$.

Embodiment 3

In the present embodiment, a magnetic head of the same structure as the magnetic head of Embodiment 2 except for a gap film formed of Ti or an alloy consisting mainly of Ti will be described.

The magnetic head of the present embodiment has the same structure as the magnetic head of Embodiment 2, except for having gap films of Ti or an alloy consisting mainly of Ti instead of the gap films 3, 4 as shown in FIGS. 7 and 8. Ti and the alloy consisting mainly of Ti are metals, and therefore form a dense film, so that intrusion and displacement by impurity atoms rarely occur. That is, in the magnetic head of the present embodiment, erosion of the gap film and the contact with glass can be avoided, and consequently dispersion between the glass and the ferrite can be eliminated.

Also, since Ti has the coefficient of thermal expansion of $85 \times 10^{-7}$ (/°C.), which is slightly smaller than that of ferrite, Ti is less likely to generate a residual stress to the ferrite due to sputtering and heat-treatment.

Because of such characteristics of Ti, unlike in the gap film of $SiO_2$, a magnetic gap can be maintained even though the magnetic head is formed with a narrower track width and a smaller gap length. Thus, the glass in the gap and the gap films 3, 4 are maintained in the perfectly non-magnetic state. Accordingly, the leakage magnetic flux toward the magnetic recording medium sufficiently occurs, thus achieving high recording/reproduction performance.

In the magnetic head of the present embodiment, as in the magnetic head of Embodiment 2, the oxidation layer 22 of Ti or an alloy consisting mainly of Ti is formed on the boundary face between the gap films 3, 4 and the fused glass 7 as shown in FIG. 18. Thus, adhesion between the gap films 3, 4 and the fused glass 7 is improved, increasing the chip strength of the magnetic head.

A method of producing the magnetic head of the present embodiment will now be described. The production method is substantially equivalent to that of Embodiment 2, except for forming a gap film of Ti.

In the present embodiment, the gap film of Ti, not shown, is formed by sputtering on the major surface 17a of the core half block 17 including the track width restriction groove 18 and the winding groove 19, as shown in FIG. 15. As Ti has the coefficient of thermal expansion slightly smaller than that of ferrite, it is less likely to generate a residual stress to the ferrite due to sputtering.

In the present embodiment, the core half blocks 17, 17 are superposed with the track positions thereof meeting each other, as shown in FIG. 16. A glass stick, not shown, is inserted between the winding grooves 19, 19, and is melted by heating to fill the fused glass 20 into a space between the track width restriction grooves 18, 18 facing each other.

Since the Ti gap film is of the metal, it does not cause particle dispersion due to erosion by glass as in the oxide, such as $SiO_2$, even though it is heated at high temperatures in the fusion process. Also, since the Ti gap film is of dense structure, erosion of the gap film and contact of glass with ferrite can be avoided, and dispersion between the glass and the ferrite does not occur.

In the present embodiment, the winding guide grooves 21, 21 are formed in the core block integrated into one unit by the fused glass 20, as shown in FIG. 17. A portion to be the rubbing surface to rub the magnetic recording medium is cylindrically abraded to be a curved surface. The core block is sliced into chips in positions indicated by dotted lines in FIG. 17 so that the azimuth angle of the magnetic gap g is 20°. In the present embodiment, the oxide layer of Ti film is formed on the boundary face between the gap film of Ti and the fused glass, exhibiting high chip strength. Therefore, the magnetic head is not damaged in the above-mentioned various processes.

In addition, in comparison with the magnetic head thus produced, the output of the magnetic head of the same structure with the gap film formed of $SiO_2$ was measured. The azimuth angle of these magnetic heads was set at 10°.

As a result, the magnetic head having the gap film of Ti exhibited 143 μVp-p at 3.13 m/s, 4.7 MHz, while the magnetic head having the gap film of $SiO_2$ exhibited 112 μVp-p. Thus, it has been found that, the Ti gap film significantly improves the output by 2.1 dB compared with the $SiO_2$ gap film.

Embodiment 4

In the present embodiment, a magnetic head having the same structure as the magnetic head of Embodiment 2, except for using a film of $Ta_2O_5$ or an oxide consisting mainly of $Ta_2O_5$ as the gap film, will be described.

The magnetic head of the present embodiment has the same structure as the magnetic head described in Embodiment 2, except for using a film of $Ta_2O_5$ or an oxide consisting mainly of $Ta_2O_5$ as the gap films 3, 4 shown in FIGS. 7 and 8. $Ta_2O_5$ or the oxide consisting mainly of $Ta_2O_5$, unlike the oxide such as $SiO_2$, causes little dispersion of particles due to erosion by glass. Thus, in the present embodiment, erosion of the gap film and contact of the gap film with ferrite can be avoided, thus eliminating dispersion between the glass and the ferrite.

$Ta_2O_5$ has a large coefficient of thermal expansion while $SiO_2$ has a coefficient of thermal expansion nearly equal to zero. Therefore, $Ta_2O_5$ applies a smaller stress to the ferrite in sputtering film formation and heat treatment, such as glass fusion, than in case where the $SiO_2$ gap film is formed. Thus, deterioration of magnetic permeability due to the residual stress of the ferrite can be prevented.

With the characteristics of $Ta_2O_5$ as described above, unlike in the case where the gap film of $SiO_2$ is formed, the magnetic gap can be maintained even though the magnetic head is formed with a narrower track width and a shorter gap length. The glass in the gap and the gap films 3, 4 are maintained in the perfectly non-magnetic state. Consequently, the leakage magnetic flux toward the magnetic recording medium occurs sufficiently in the magnetic gap part, achieving high recording/reproduction performance.

In the magnetic head of the present embodiment, as the fused glass and $Ta_2O_5$ or the oxide consisting mainly of $Ta_2O_5$ are both oxides, the coupling layer 22 of $Ta_2O_5$ or the oxide consisting mainly of $Ta_2O_5$ is formed on the boundary face between the gap films 3, 4 and the fused glass 7, as shown in FIG. 17, similar to the magnetic head of Embodiment 2. Thus, adhesion between the gap films 3, 4 and the fused glass 7 can be improved, and the chip strength of the magnetic head is increased.

Figure 20:
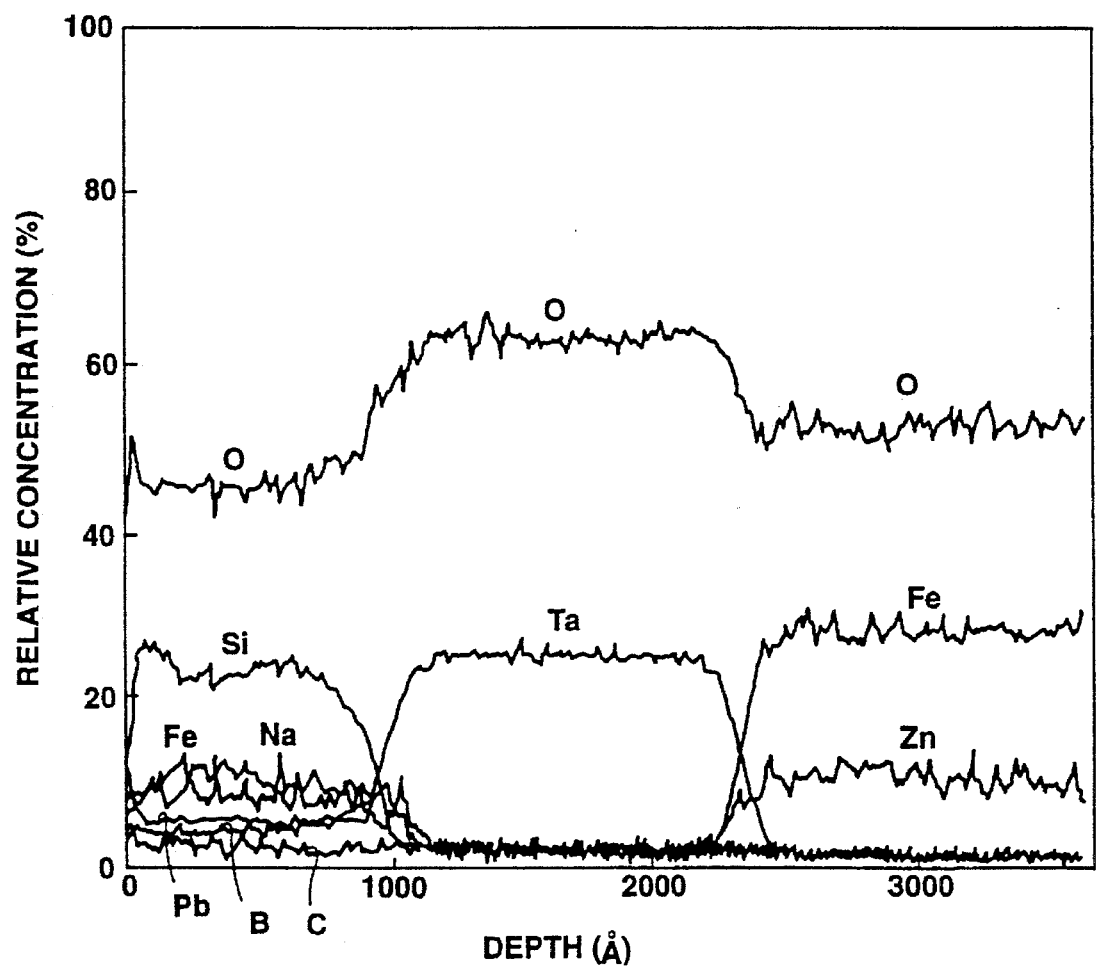
FIG. 20 is a graph showing results of an analysis of the boundary face between $Ta_2O_5$ and the magnetic ferrite.

The above effect is made apparent by the following fact. A film of $Ta_2O_5$ was formed with a thickness of 850 Å on a magnetic ferrite substrate, and a fused glass with a thickness of 2000 Å considered to be necessary for producing a magnetic head was formed thereon by sputtering. The resulting product was heat-treated at 530° C. for one hour. Then, the boundary face between $Ta_2O_5$ and the magnetic ferrite was analyzed with the Auger Electron Spectroscopy. The result of the analysis is shown in FIG. 20. From this result, it has been found that oxygen components of the fused glass and $Ta_2O_5$ are coupled with each other, improving adhesion between the fused glass and $Ta_2O_5$, to increase the chip strength of the magnetic head. In FIG. 20, abscissas indicate the depth in the direction of film thickness with 0 indicating the surface of the fused glass, while ordinates indicate relative concentration.

In addition, in the magnetic head of the present embodiment, $Ta_2O_5$ or the oxide consisting mainly of $Ta_2O_5$ is used for the gap film, and there is not a great difference between abrasion properties of $Ta_2O_5$ or the oxide consisting mainly of $Ta_2O_5$ on one hand and the magnetic ferrite forming the magnetic core substrate and the fused glass on the other. Thus, unusual wear is unlikely to occur.

A method of producing the magnetic head of the present embodiment will now be described. The present method is substantially equivalent to the method described in Embodiment 2, except for forming the gap film of $Ta_2O_5$.

In the present embodiment, a gap film of $Ta_2O_5$, not shown, is formed by sputtering on the major surface 17a of the core half block 17 including the track width restriction groove 18 and the winding groove 19, as shown in FIG. 15. Since $Ta_2O_5$ has a coefficient of thermal expansion greater than that of $SiO_2$, $Ta_2O_5$ does not cause any residual stress to the ferrite due to sputtering.

Also, in the present embodiment, the core half blocks 17, 17 are superposed with the track positions thereof meeting each other, as shown in FIG. 16. A glass stick, not shown, is inserted into the winding grooves 19, 19, and is melted by heating to fill the fused glass into the space between the facing track width restriction grooves 18, 18.

The gap film of $Ta_2O_5$ is metallic and therefore does not cause particle dispersion due to erosion by glass as in the case of the oxide such as $SiO_2$, even though the $Ta_2O_5$ gap film is heated at high temperatures in the fusion process. The erosion of the gap film and the contact of the gap film with the glass can be avoided, and the dispersion between the glass and the ferrite does not occur.

In the present embodiment, a variety of processing are carried out, as shown in FIG. 17. For example, the winding guide grooves 21, 21 are formed in the core block integrated into one unit by the fused glass 20, as shown in FIG. 17. The part to be the rubbing surface to slide on the magnetic recording medium is cylindrically abraded to be a curved surface. The core block is sliced into chips in positions indicated by dotted lines in FIG. 17 so that the azimuth angle of the magnetic gap g is a predetermined angle. In the present embodiment, oxygen components of the fused glass and the $Ta_2O_5$ film are coupled with each other, forming the coupling layer on the boundary face between the gap film of $Ta_2O_5$ and the fused glass. Thus, the adhesion between the gap film and the fused glass is improved, and the chip strength is increased, preventing damages to the magnetic head in the above-mentioned variety of processing.

In addition, in comparison with the magnetic head thus produced, the output of a magnetic head of the same structure except for having a gap film of $SiO_2$ was measured. The azimuth angle of these magnetic heads were set at 10°.

As a result, the magnetic head having the gap film of $Ta_2O_5$ exhibited 143 μVp-p at 3.13 m/s, 4.7 MHz, while the magnetic head having the gap film of $SiO_2$ exhibited 112 μVp-p. Thus, it has been found that the gap film of $Ta_2O_5$ greatly improves the output by 2.1 dB compared with the gap film of $SiO_2$.

As is clear from the above description, in the magnetic head of the present invention, platinum, the platinum group, or an alloy consisting mainly of platinum or the platinum group is used for the gap film. Platinum, the platinum group, or an alloy consisting mainly of platinum or the platinum group is high in covering property, dense in structure and insoluble into ferrite and glass, and has the coefficient of thermal expansion in conformity with that of ferrite. Therefore, dispersion reaction due to the contact between glass and ferrite can be avoided, and the residual stress can be prevented from being applied to the ferrite. Thus, magnetic permeability and soft magnetic property inherent in ferrite can be sufficiently exhibited. Consequently, with the magnetic head of the present invention, even though the magnetic head is formed with a narrower track and a narrower gap, information signals can be densely written into the magnetic recording medium and the densely written information signals can be read out. Thus, high density magnetic recording can be achieved.

Also, in the magnetic head of the present invention, Cr or an alloy consisting mainly of Cr, which does not cause particle dispersion due to erosion by glass, is used for the gap film. Therefore, dispersion reaction caused by the contact between glass and ferrite can be avoided, and magnetic permeability and soft magnetic property inherent in ferrite can be sufficiently exhibited. Consequently, with the magnetic head of the present invention, even though the magnetic head is formed with a narrower track and a narrower gap, information signals can be densely written into the magnetic recording medium. Thus, high density magnetic recording can be achieved. Also, in the magnetic head of the present invention, since the oxidation layer is formed on the boundary face between the film of Cr or the alloy consisting mainly of Cr and the fused glass, the adhesion between the film and the fused glass is improved and the chip strength can be increased.

In addition, in the magnetic head of the present invention, Ti or an alloy consisting mainly of Ti, which avoids particle dispersion due to erosion by glass, has dense film structure and has a coefficient of thermal expansion slightly smaller than that of ferrite, is used for the gap film. Therefore, dispersion reaction due to the contact between glass and ferrite can be avoided, and the residual stress can be prevented from being applied to the ferrite. Thus, magnetic permeability and soft magnetic property inherent in ferrite can be sufficiently exhibited. Consequently, with the magnetic head of the present invention, even though the magnetic head is formed with a narrower track and a narrower gap, information signals can be densely written into the magnetic recording medium. Thus, high density magnetic recording can be achieved. Also, in the magnetic head of the present invention, since the oxidation layer is formed on the boundary face between the film of Ti or the alloy consisting mainly of Ti and the fused glass, adhesion between the film and the fused glass can be improved and the chip strength can be increased.

Furthermore, in the magnetic head of the present invention, $Ta_2O_5$ or an oxide consisting mainly of $Ta_2O_5$ is used for the gap film. $Ta_2O_5$ or the oxide consisting mainly of $Ta_2O_5$ avoids particle dispersion due to erosion by glass, and has dense film structure and a coefficient of thermal expansion slightly smaller than that of ferrite. Therefore, dispersion reaction due to the contact between glass and ferrite can be avoided, and the residual stress can be prevented from being applied to the ferrite. Thus, magnetic permeability and soft magnetic property inherent in ferrite can be sufficiently exhibited. Consequently, with the magnetic head of the present invention, even though the magnetic head is formed with a narrower track and a narrower gap, information signals can be densely written into the magnetic recording medium. Thus, high density magnetic recording can be achieved. Also, in the magnetic head of the present invention, since the oxidation layer is formed on the boundary face between $Ta_2O_5$ or the oxide consisting mainly of $Ta_2O_5$ and the fused glass, adhesion between the film and the fused glass can be improved and the chip strength can be increased. In addition, in the magnetic head of the present invention, since $Ta_2O_5$ or the oxide consisting mainly of $Ta_2O_5$ having little difference in abrasion property from magnetic ferrite and the fused glass is used for the gap film, unusual wear is unlikely to occur and deterioration in property, such as spacing loss, can be prevented.

What is claimed is:

1. A magnetic head comprising a pair of magnetic core substrate formed of an oxide magnetic material, each one of the magnetic core substrates having a gap forming abutment surface, at least one of the magnetic core substrates having a gap film formed directly on the abutment surface, the pair of magnetic core substrates being abutted to each other along said abutment surfaces, the abutment surfaces having said gap film between them, the gap film being formed of a material selected from the group consisting of platinum, the platinum group, and an alloy consisting mainly of platinum or the platinum group.

2. The magnetic head as claimed in claim 1, wherein the pair of magnetic core substrates are bonded to each other to be integrated into one unit by a non-magnetic glass.

3. The magnetic head as claimed in claim 1, wherein the magnetic gap has a track width of 50 μm or less.

4. The magnetic head as claimed in claim 1, wherein the gap film formed on the magnetic core substrate has a thickness of 150 nm and less.

5. A magnetic head comprising a pair of magnetic core substrates formed of an oxide magnetic material, each one of the magnetic core substrates having a gap forming abutment surface, at least one of the magnetic core substrates having a gap film composed of an oxide magnetic material formed directly on the abutment surface, the pair of magnetic core substrates being abutted to each other along said abutment surfaces, the abutment surfaces having said gap film between them, the gap film being formed of a material selected from the group consisting of Cr and an alloy consisting mainly of Cr.

6. A magnetic head comprising a pair of magnetic core substrate formed of an oxide magnetic material, each one of the magnetic core substrates having a gap forming abutment surface, at least one of the magnetic core substrates having a gap film formed directly on the abutment surface, the pair of magnetic core substrates being abutted to each other along said abutment surfaces, the abutment surfaces having said gap film between them, the gap film being formed of a material selected from the group consisting of Ti and an alloy consisting mainly of Ti.

7. A magnetic head comprising a pair of magnetic core substrate formed of an oxide magnetic material, each one of the magnetic core substrates having a gap forming abutment surface, at least one of the magnetic core substrates having a gap film formed directly on the abutment surface, the pair of magnetic cores being abutted to each other along said abutment surfaces, the abutment surfaces having said gap film between them, the gap film being formed of a material selected from the group consisting of $Ta_2O_5$ and an alloy consisting mainly of $Ta_2O_5$.

8. The magnetic head as claimed in claim 1, wherein at least one of the magnetic core substrates has the abutment surface thereof inversely sputtered and then has the gap film formed thereon.

* * * * *